No. 784,828. PATENTED MAR. 14, 1905.
E. ARMSTRONG.
GRAIN SEPARATOR SIEVE.
APPLICATION FILED FEB. 10, 1902. RENEWED JAN. 20, 1905.
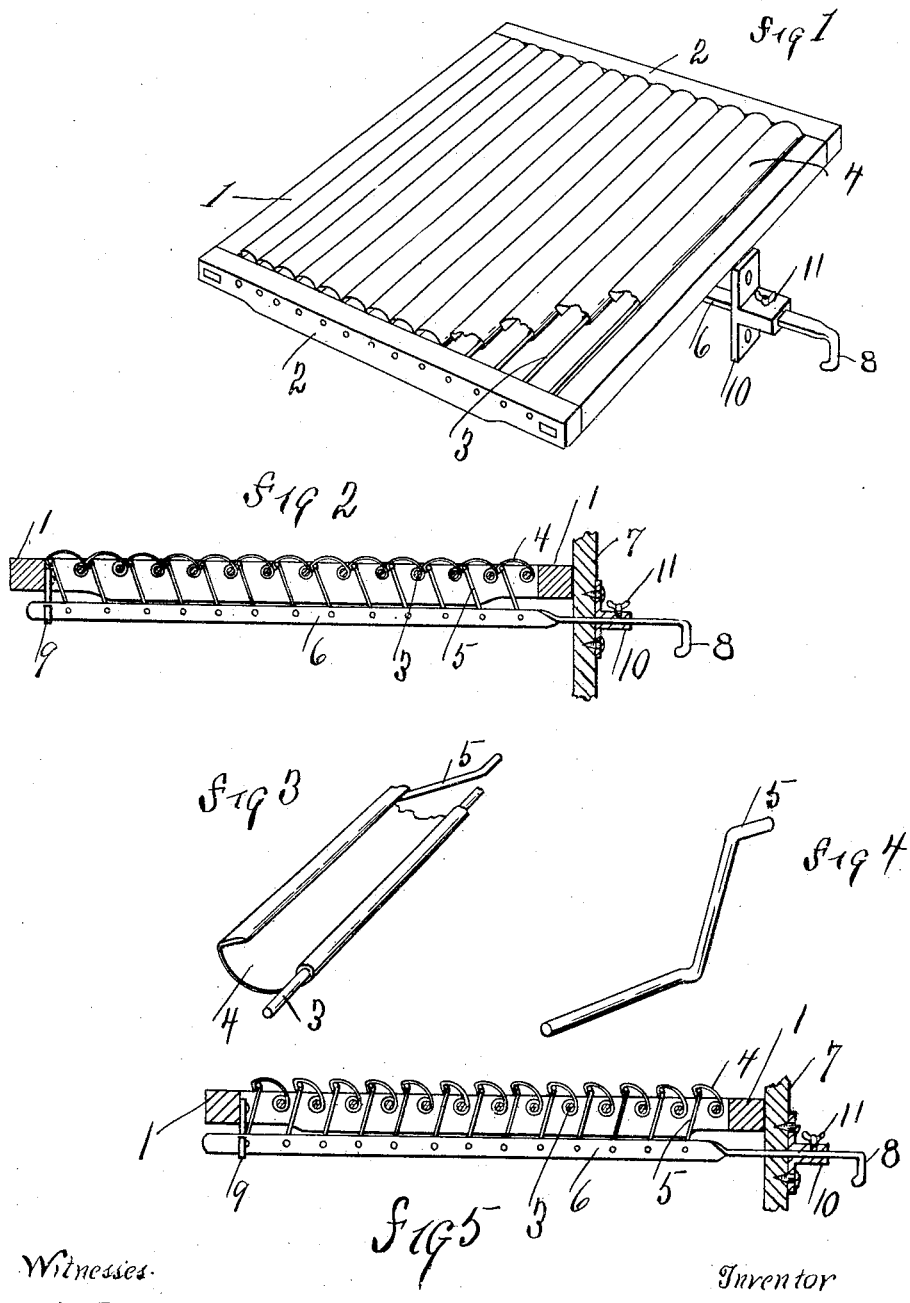
Witnesses.
E. H. Nelin
J. R. Bond
Inventor
Eliphalet Armstrong
By Atty F. W. Bond No. 784,828. Patented March 14, 1905.

UNITED STATES PATENT OFFICE.

ELIPHALET ARMSTRONG, OF MANSFIELD, OHIO, ASSIGNOR, BY DIRECT AND MESNE ASSIGNMENTS, OF ONE-HALF TO LORENZO D. PATTEN AND SAMUEL S. BRICKER, OF MANSFIELD, OHIO.

GRAIN-SEPARATOR SIEVE.

SPECIFICATION forming part of Letters Patent No. 784,828, dated March 14, 1905.

Application filed February 10, 1902. Renewed January 20, 1905. Serial No. 241,964.

*To all whom it may concern:*

Be it known that I, ELIPHALET ARMSTRONG, a citizen of the United States, residing at Mansfield, in the county of Richland and State of Ohio, have invented certain new and useful Improvements in Grain-Separator Sieves; and I do hereby declare that the following is a full, clear, and exact description of the same, reference being had to the annexed drawings, making a part of this specification, and to the characters of reference marked thereon, in which—

Figure 1 is a perspective view showing the top of the device, also showing portions of the concavo-convex pivoted blades broken away. Fig. 2 is a transverse section showing the position of the pivoted concavo-convex blades when the separator-sieve is closed. Fig. 3 is a detached view showing a portion of one of the concavo-convex blades and illustrating its adjusting operating-arm connected thereto. Fig. 4 is a detached view of one of the adjusting operating-arms. Fig. 5 is a transverse section showing the separator-sieve open.

The present invention has relation to grain-separator sieves; and it consists in the novel construction hereinafter described, and particularly pointed out in the claim.

Similar numerals of reference indicate corresponding parts in all the figures of the drawings.

In the accompanying drawings, 1 represents the side members, and 2 the end members, of a rectangular frame, which are joined together in any convenient and well-known manner and are formed of lengths to correspond with the size of the grain-separator sieve designed to be constructed. To the end members of the rectangular frame are journaled a series of rods or bars 3, to which rods or bars are securely attached in any convenient and well-known manner the concavo-convex blades 4. The journaled rods or bars 3 and the concavo-convex blades 4 extend lengthwise of the grain-separator sieve, thereby locating the concavo-convex blades parallel with the air-blast, by which arrangement a grain-separator sieve is provided the top or upper face of which is in the same plane throughout its entire length.

For the purpose of providing a means for turning the concavo-convex blades so as to adjust the space between the fixed edges and the free edges of said blades each of the blades is provided with an adjusting operating-arm 5 and the arms extended downward from the free edges of the concavo-convex blades and their bottom or lower ends pivotally connected to the reciprocating rod 6, which reciprocating rod is extended through the side of the shoe 7, as illustrated in Fig. 2, and its outer end provided with an operating handle or knob 8. The inner end of the reciprocating rod 6 is supported and held by means of the bracket 9. The object and purpose of providing the bracket 9 is to cause the reciprocating rod 6 to move in the same plane back and forth throughout its entire length, the outer end of said reciprocating rod being held in true horizontal position by means of the bracket 10, which bracket is securely attached in any convenient and well-known manner to the outside of the machine.

The adjusting operating-arms 5 are attached to the concavo-convex blades 4 at their free edges, and when the blades are brought into position so as to bring the free edges of one of the concavo-convex blades 3 in contact with the fixed edges of its adjoining-blade the sieve proper is in closed position and the arms 5 located at an angle to a vertical line. When it is desired to open the separator, or, in other words, to produce spaces for the different kinds and sizes of grain to be cleaned, the reciprocating rod 6 is moved, by which arrangement the arms 5 are brought into a true vertical position at the time the blades are lifted at their free edges to the extreme height, it being understood that the different degrees of adjustment are brought about by different movements of the reciprocating rod 6. After the blades have been adjusted for any particular kind of grain the set-screw 11 is turned downward, so as to clamp the reciprocating rod 6 and prevent any movement thereof.

It will be understood that by providing the concavo-convex blades 4 and locating them lengthwise of the separator-sieve the grain will fall between the blades in rows lengthwise of the sieve and air-blast, thereby allowing the blast to pass through the rows of falling grain and to remove any foreign substance that may pass down with the grain, which arrangement prevents the blast from banking the grain and passes as unimpeded.

It will be understood that by providing the concavo-convex blades 4 as described and locating the convexed faces of said blades upon the upper side of the grain-separator sieve proper all grain and seeds will immediately pass between the open spaces of said blades, thereby preventing the grain from following along the separator-sieve proper.

Having fully described my invention, what I claim as new, and desire to secure by Letters Patent, is—

The combination of a rectangular frame, a series of rods or bars journaled to the frame members and in parallel relation with each other, concavo-convexed blades secured to the parallel rods or bars, adjustable operating-arms attached to the free edges of the concavo-convexed blades and a reciprocating rod, said arms pivotally attached to the reciprocating rod, and means for holding said reciprocating rod in fixed adjustment, and means for supporting the inner end of the rod, substantially as and for the purpose specified.

In testimony that I claim the above I have hereunto subscribed my name in the presence of two witnesses.

ELIPHALET ARMSTRONG.

Witnesses:
CLAUDE R. YARDLEY,
S. S. BRICKER.